(12) United States Patent
Oram

(10) Patent No.: US 6,755,595 B2
(45) Date of Patent: Jun. 29, 2004

(54) RISER IMPACT PROTECTION

(75) Inventor: Robert Kenneth Oram, Aberdeen (GB)

(73) Assignee: CRP Group Limited, Lancashire (GB)

( * ) Notice: Subject to any disclaimer, the term of this patent is extended or adjusted under 35 U.S.C. 154(b) by 0 days.

(21) Appl. No.: 10/162,068

(22) Filed: Jun. 5, 2002

(65) Prior Publication Data

US 2003/0089075 A1 May 15, 2003

(51) Int. Cl.[7] .............................. F15D 1/10; F16L 1/20
(52) U.S. Cl. .................... 405/216; 405/168.1; 405/212; 114/243
(58) Field of Search ............................. 405/157, 168.1, 405/168.2, 211, 211.1, 212, 213, 215, 216; 52/721.1–723.2, 736.3, 736.4, 738.1; 14/76; 166/367; 114/243

(56) References Cited

U.S. PATENT DOCUMENTS

| 4,004,531 A | * | 1/1977 | Mott .......................... 114/256 |
| 4,176,986 A | * | 12/1979 | Taft et al. .................... 405/211 |
| 4,646,840 A | * | 3/1987 | Bartholomew et al. ..... 166/350 |
| 4,858,688 A | * | 8/1989 | Edwards et al. .......... 166/241.4 |
| 4,909,327 A | * | 3/1990 | Roche ......................... 166/359 |
| 5,380,131 A | * | 1/1995 | Crawford .................... 405/216 |

FOREIGN PATENT DOCUMENTS

GB      2286649 A   *   8/1995  ............. F16L/1/24

OTHER PUBLICATIONS

Dunlaw Engineering: Clamping Systems, Aug. 24, 2000, http://web.archive.org/web/20010305075755/www.dunlaw.com/clamp.*

Carrado, Kathleen A., Kevlar: The Millennium Molecule, Jan. 2000, Argonne National Labs, ChemShorts for Kids—2000.*

* cited by examiner

Primary Examiner—Thomas B. Will
Assistant Examiner—Tara L. Mayo
(74) Attorney, Agent, or Firm—Clark & Brody

(57) ABSTRACT

A shell for providing impact protection to a marine drilling riser, the shell comprising a body having at least one hollow chamber defined by inner and outer faces of the shell, the body being provided with a plurality of holes allowing flooding of the chamber.

18 Claims, 8 Drawing Sheets

RISER IMPACT PROTECTION

This invention relates to a riser impact protection.

Substantial effort is spent in seeking hydrocarbons under water. The drilling rig is provided with a drilling riser which typically comprises a central large diameter pipe (which may be of the order of 0.5 to 0.6 m). The riser acts as a conduit for a drillstring between the drilling rig and the seabed BOP/wellhead assembly. Additionally drilling fluid and cuttings are transported back up the riser to the surface, having been pumped down the drillstring, for processing and reclamation of the drilling fluid. Around the central pipe there is typically provided a plurality for example 2, 3 or 4 smaller risers. These risers handle other process fluids to assist with control operations such as running and shutdown.

With the depletion of reserves in shallow and relatively calm water, there has become a move towards exploration of deep and/or rough water. In deep waters of the order of 600 m or more, a simple riser can be difficult to use. First, the suspended weight of the riser may be such as to affect the stability of the drill ship. Secondly, the weight of depending riser may be so great that towards the top of the riser assembly the material may be damaged as the tensile properties are exceeded.

Conventionally to overcome this problem much of the weight of the riser assembly is offset by buoyancy attached to it. Typically, around 65 to 90% of the submerged weight is offset by the use of buoyancy. The buoyancy may take the form of strapped-on modules of syntactic foam. Examples of such modules are described in our GB 2 286 649.

While buoyancy offsetting around 65 to 90% of the submerged weight of the suspended string is typically used, the buoyancy is not applied uniformly over the length of the drillstring. Typically, a substantial part of the bottom of the drill string is not "dressed". Leaving the bottom portion "undressed" provides a stabilising weight for the drillstring prior to connection to the BOP/wellhead assembly. Additionally because the surface portion is typically subject to the highest current velocity it may be left undressed to reduce drag and riser deflection.

The drillship is provided with a "rotary table" through which the riser joints pass. The rotary table is a steel structure with a hole through which the riser module assembly passes. A working clearance is provided between the module assembly and the hole. Nevertheless, during operation subsurface currents impinging on the suspended riser deflect it from vertical. Surface waves also cause the drillship to move relative to the riser. These relative movements can cause the assembly to abut the hole in the rotary table. Where the riser is dressed the energy of the impact is taken by the buoyancy material which may suffer some damage. However in most cases where the riser is dressed the smaller pipes, and the main riser are protected from damage. Where, however, the riser is undressed this protection is not present and substantial impact damage can occur.

U.S. Pat. No. 4,004,531 seeks to reduce the relative movement of the riser string and the drillship by providing the drillship with a downwardly depending caisson which surrounds the riser but is not attached to it. The caisson is provided with a plurality of holes. The intention is that the force of waves and currents impinging on the caisson is reduced and therefore reduces the relative movement of drillship and riser.

The invention seeks to provide a way of reducing the likelihood of damage without providing unwanted and expensive additional buoyancy.

In accordance with the invention the problem is solved by providing a hollow shell which floods on immersion with water. The shell which should be impact resistant is air-filled when out of the water and therefore relatively easy to handle. Following immersion the shell floods giving a structure of broadly neutral buoyancy.

According to an aspect of the invention there is provided a shell for providing impact protection to a marine drilling riser, the shell comprising a body having at least one hollow chamber, the body being provided with a plurality of holes allowing flooding of the chamber. The shell can comprise a plurality of shell elements joined together. The shell can be rotationally moulded, blow moulded, injection moulded or fabricated in other ways. The shell can comprise thermoplastics material such as polyethylene or it can comprise a thermosetting resin composite or a thermoplastic composite. A plurality of tubes may extend through the chamber. At least one tube can be solid and at least one tube can be filled for example with a material having a high compressive modulus such as hard polyurethane elastomer. The shell elements can be joined together by one or more bolts or straps which may comprise stainless steel, titanium or Kevlar® (polyparaphenyleneterephthalate). The shell can have a length in the range 0.5 to 5 m preferably 1 to 4 m. The shell together with any straps and thrust collars can be broadly of neutral bulk density when submerged in seawater for example having a bulk density in seawater within the range of 0.95 to 1.05 times the bulk density of seawater. In some embodiments of the invention one of the inner face and the outer face is provided with furrows directed into the chamber and the other of the outer face and the inner face is provided with co-operating projections directed into the chamber.

Embodiments of the invention will be illustrated by way of non-limiting example by reference to the accompanying figures of which FIG. 1 is a perspective view of a shell element of use in the invention;

Some of the figures employ conventional engineering draughtsman's practice and may show hidden features by broken lines, construction lines and dimensioning features.

The illustrated embodiment of the invention comprises a rotationally moulded polyethylene shell element 1. It will be apparent to the skilled worker that other fabrication techniques and materials can be employed.

As illustrated two identical shell elements surround the riser to make a complete shell. While it may be preferred on logistical grounds to use two identical shell elements it is neither essential that two be used nor that the elements be identical. A shell of a single element is not, generally, preferred since it would need either to threaded onto the end of the riser or to be slotted or hinged. Where more than three or four elements are provided too much labour may be required to assemble the shell. As previously noted while it may be preferred that the elements are identical the disposition of the small risers about the large riser may force the provision of dissimilar elements.

Element 1 has provided in it a first longitudinal groove 2 which in the complete shell defines a main riser channel. Element 1 has further provided in it a second longitudinal groove 3 which in the complete shell defines a subsidiary riser channel. In a similar manner third and fourth longitudinal grooves 4, 5 define further subsidiary riser channels.

The element 1 has relatively thin walls which define a chamber. The element is intended to withstand impact, possibly incurring damage in the process and therefore unduly thin walls should be avoided. However very thick walls are not preferred since the material of which it is made first has a cost and second is unlikely to have neutral buoyancy: it will probably either be more or less dense than seawater. Unnecessarily thick walls therefore involve unnecessary expense. The positive or negative buoyancy of the material, if large, can have unfortunate effects on the performance of the riser as a whole. While the invention has been described by reference to an element having a single chamber it is envisaged that some embodiments of the invention may have several chambers.

Figure 1:
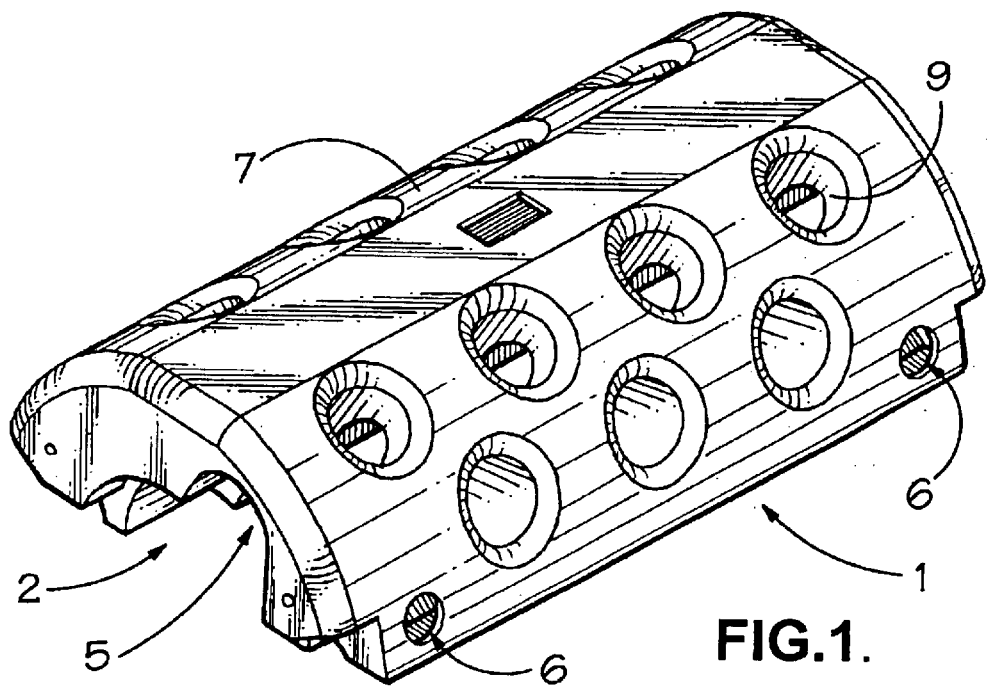
Figure 2:
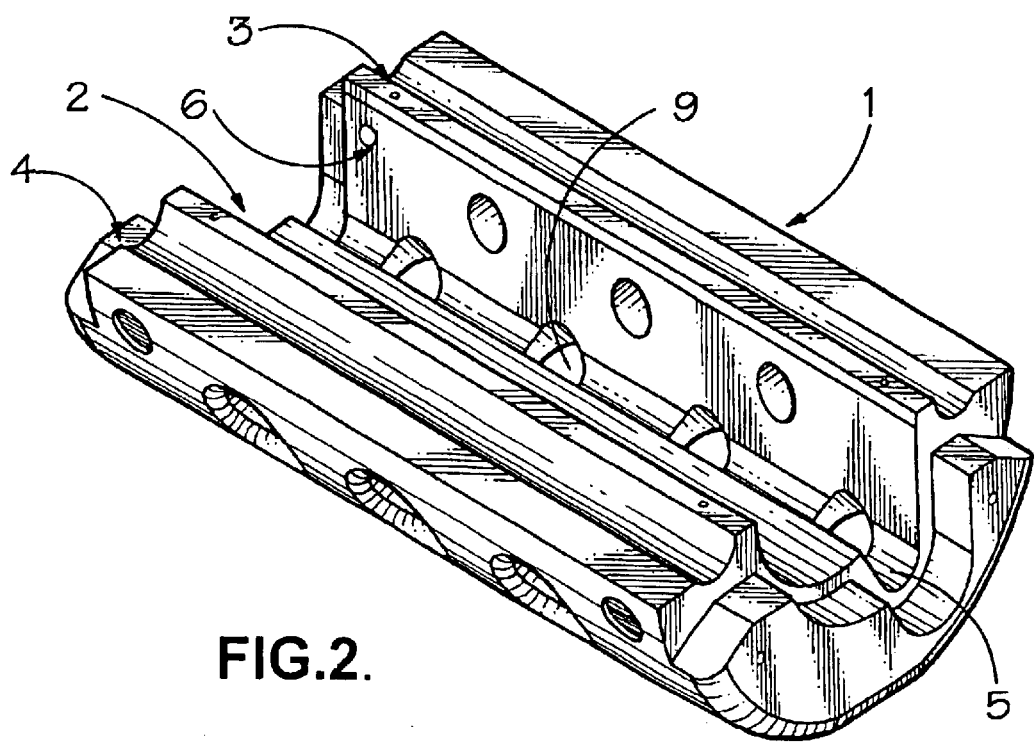
FIG. 2 is a further perspective view of the shell element of FIG. 1.
Figure 3:
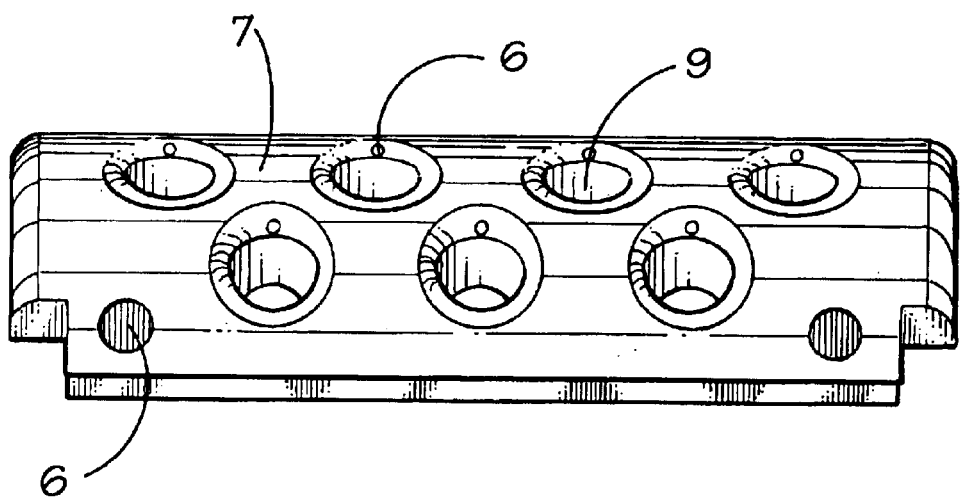
FIG. 3 is a plan view of the shell element of FIG. 1 and 2.
Figure 4:
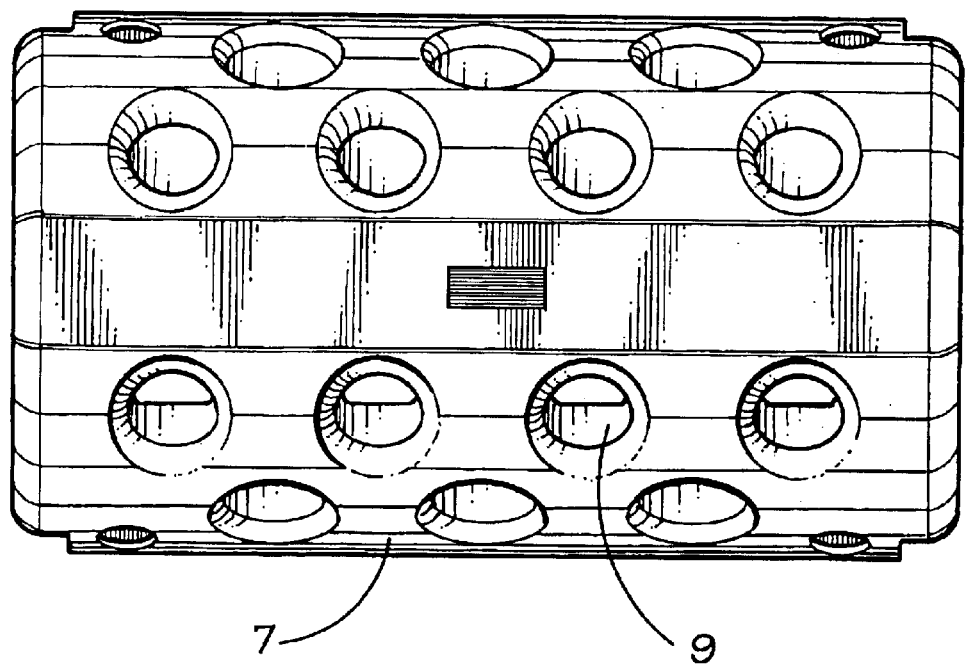
FIG. 4 is a side elevation of the shell element of FIGS. 1, 2, and 3.
Figure 5:
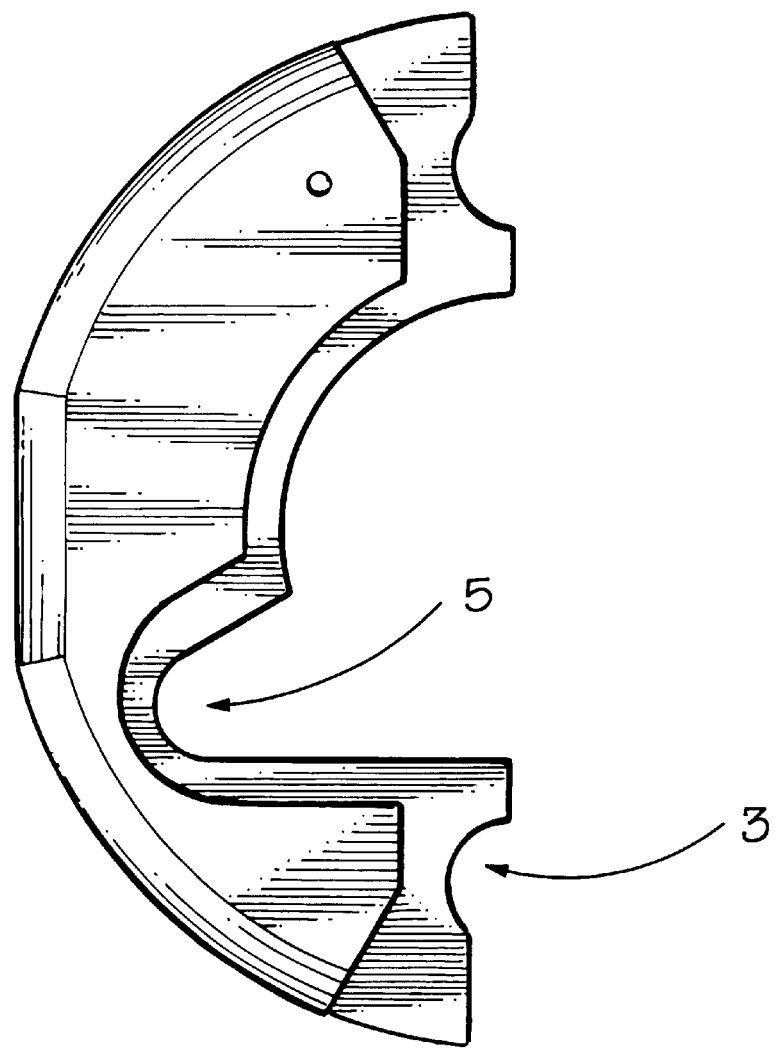
FIG. 5 is an end elevation of the shell element of FIGS. 1, 2, 3 and 4
Figure 6:
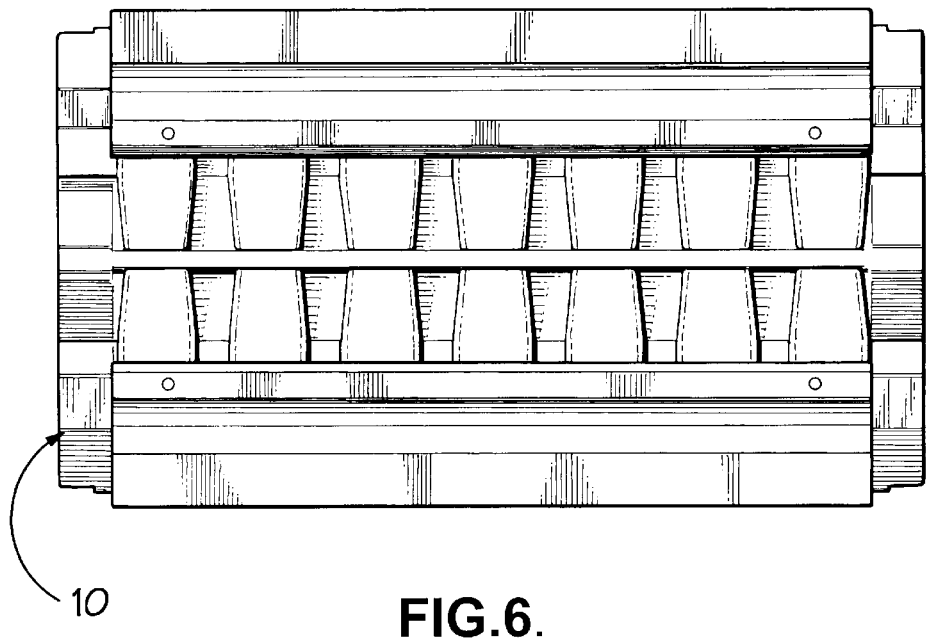
FIG. 6 is a bottom plan view of a further shell element of the invention.
Figure 11:
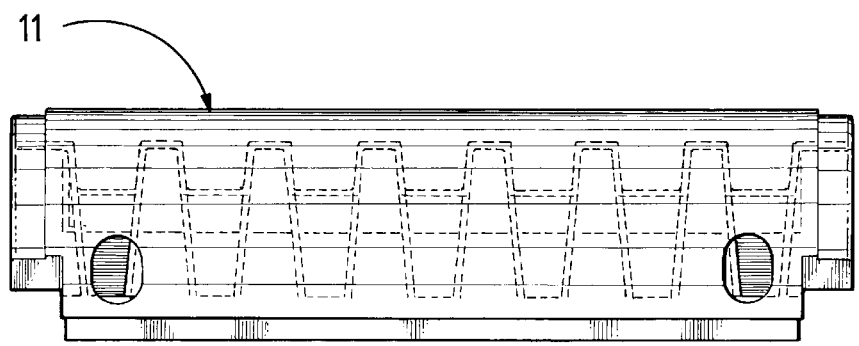
FIG. 11 is a side elevation of the shell element of FIGS. 6 to 10.
Figure 7:
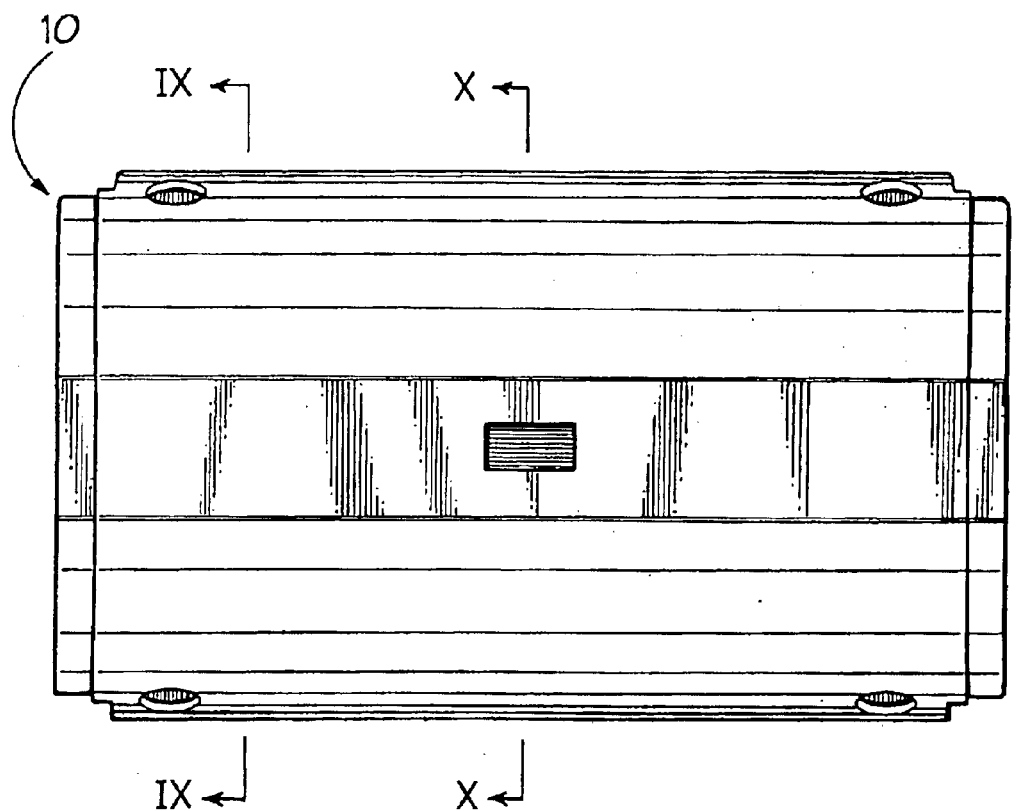
FIG. 7 is a top plan view of the shell element of FIG. 6.
Figure 8:
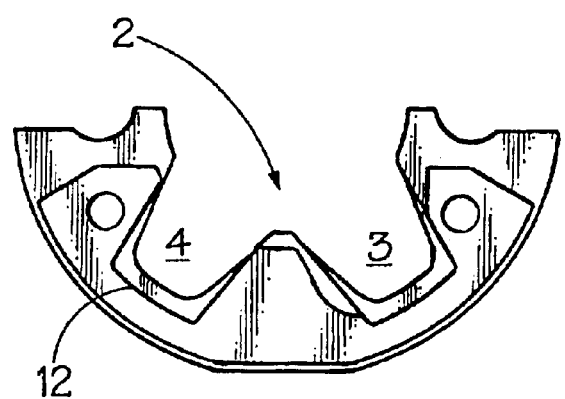
FIG. 8 is an end elevation of the shell element of FIGS. 6 and 7.
Figure 9:
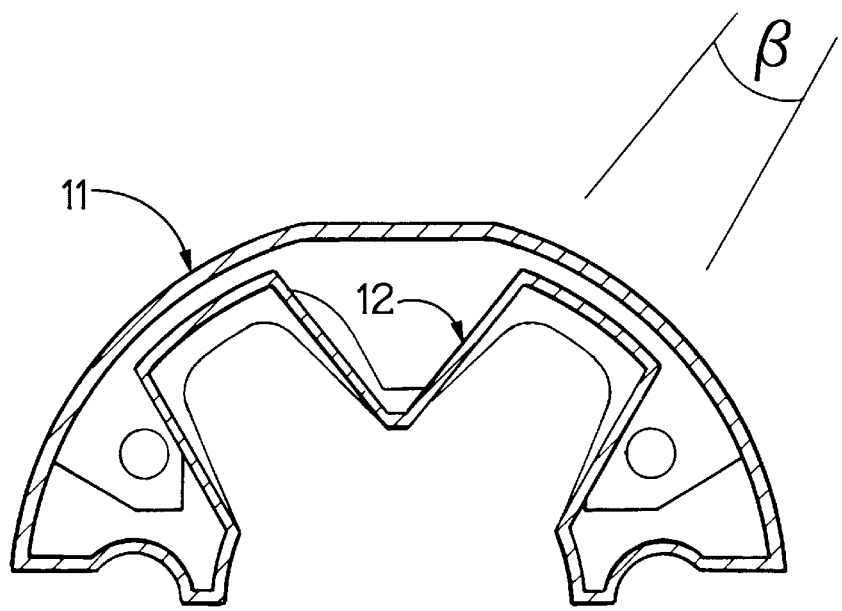
FIG. 9 is a section on A—A.
Figure 10:
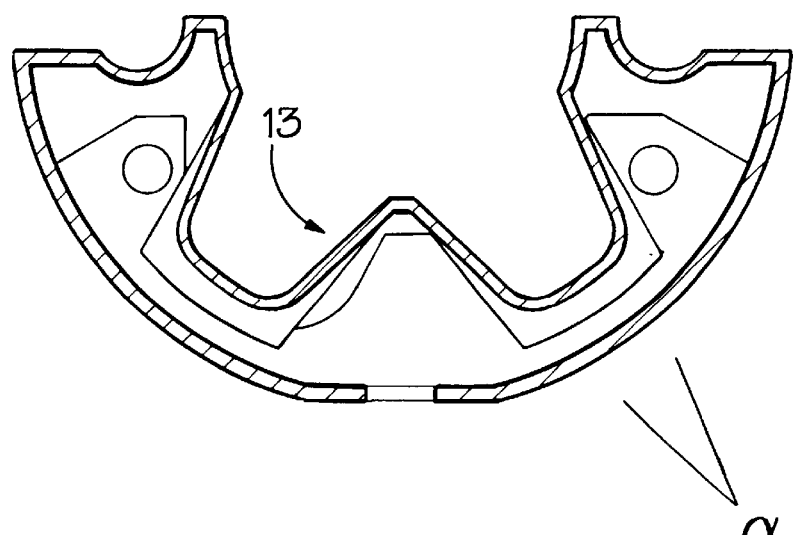
FIG. 10 is a section on B—B.
Figure 12:
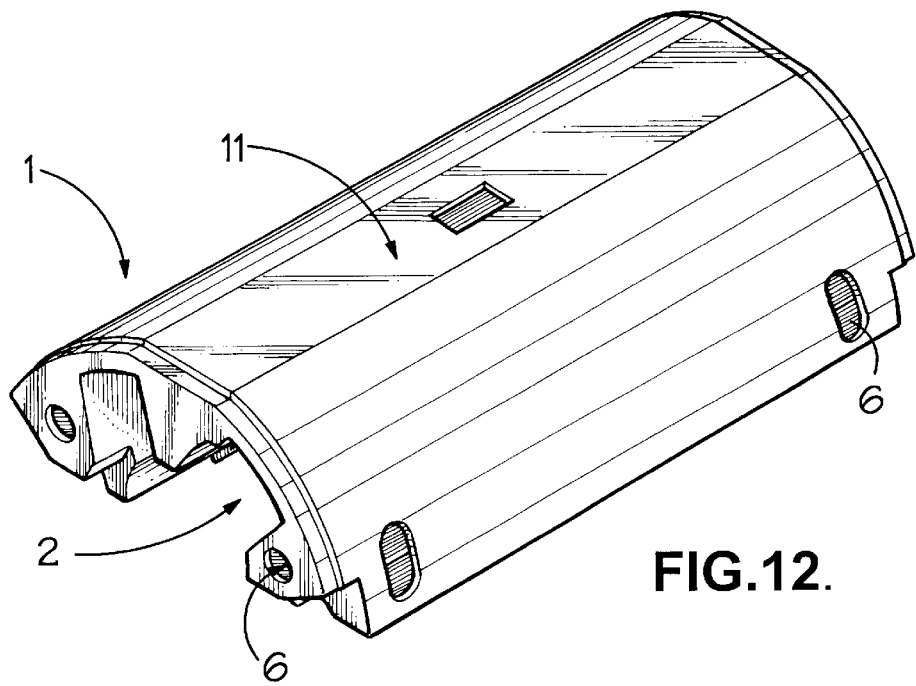
FIG. 12 is an isometric view from above of the shell element of FIGS. 6 to 11.
Figure 13:
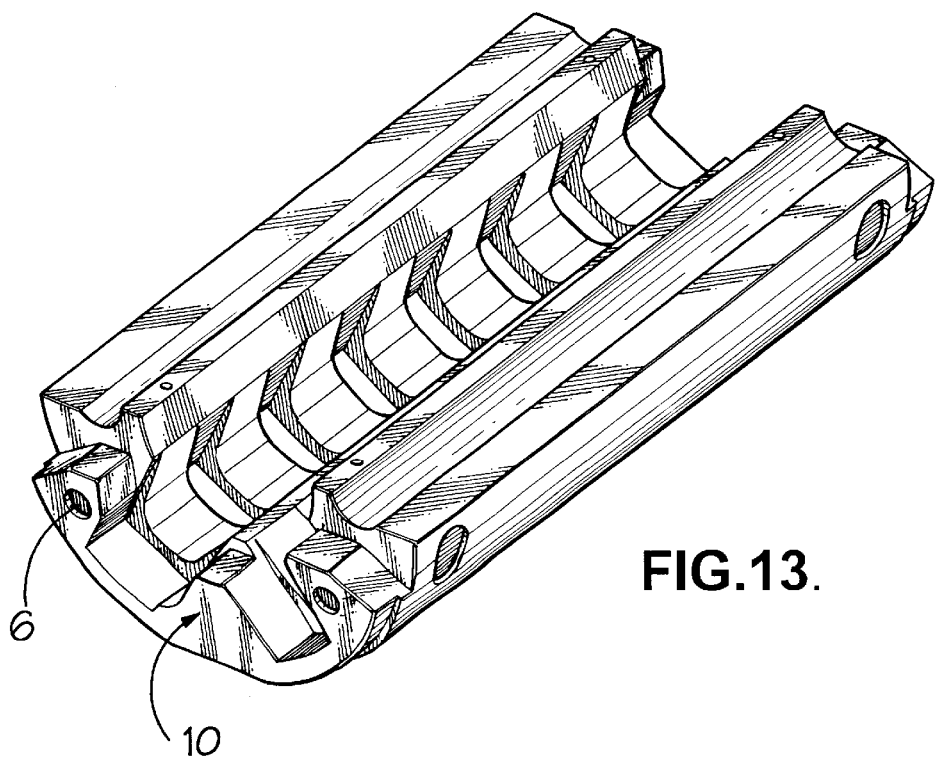
FIG. 13 is an isometric view from beneath of the shell element of FIGS. 6 to 12.
Figure 14:
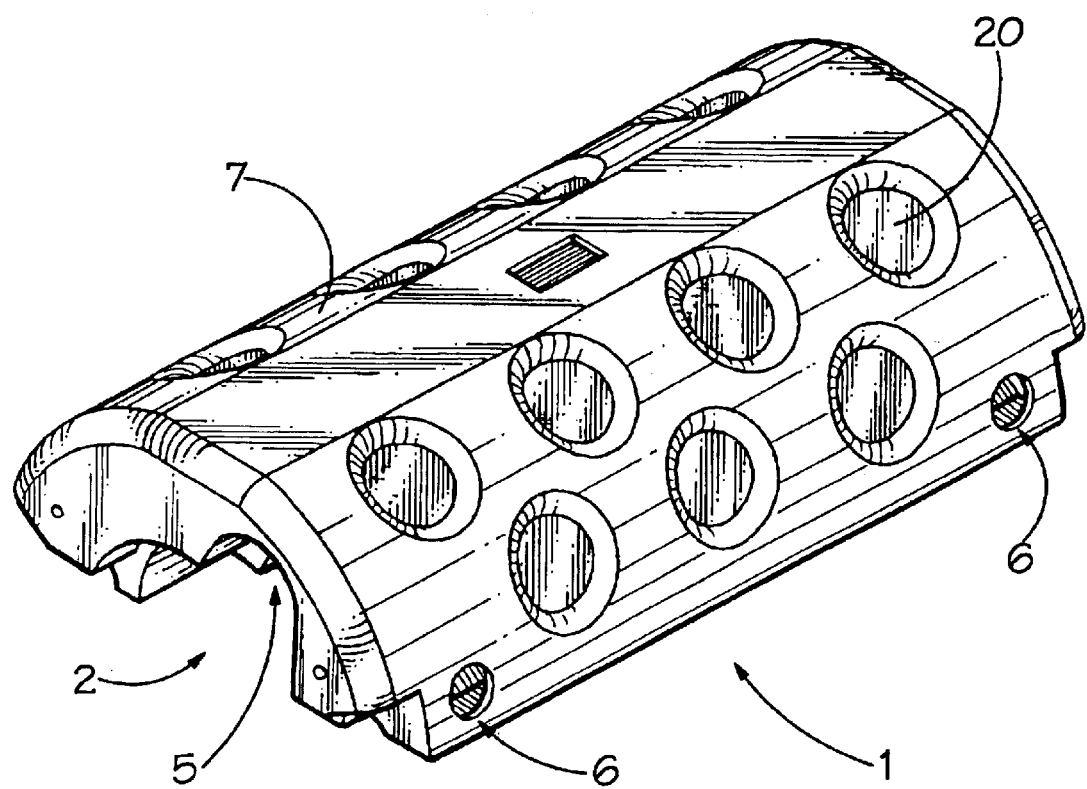

Holes 6 are provided in the element. These holes allow water to enter the chamber or chambers when the element is immersed and for it to drain away when removed from the water. While only a small number of small holes are shown in the illustrations, it may be desirable in fact to provide a larger number and/or larger holes to ensure rapid flooding and draining of the chamber. In the first embodiment, of FIGS. 1 to 5, the holes are provided on outwardly directed faces of the element. While this arrangement may act as a vortex spoiler and hence reduce vortex shedding and hence riser vibration it is possible that the arrangement may be subject to excessive drag and thus be urged by waves and current. The embodiment of FIGS. 6 to 13 therefore provides holes in a face abutting a face of an adjacent element. In the illustrated embodiment of FIGS. 6 to 13 holes are provided in an end face 10 of the element.

To enhance the impact resistance of the element it may in some embodiments of the invention be desirable to provide means for reducing deflection and/or damage when a compressive load is exerted on the outside of the element. In the illustrated embodiment of FIGS. 1 to 5, a plurality of tubes are provided extending between the outside surface 7 of the element and the inside for example the longitudinal groove 2. These stiffening tubes reduce deformation of the element on impact with the rotary table. It is not however essential that tubes be used. Plates, which may divide the chamber into several parts or struts may be provided. Tubes especially of large diameter provide however a good deal of strengthening without use of a large amount of material. The stiffeners can be formed in situ with the rest of the element or fabricated in. They can but need not be made of the same material as the bulk of the element. In the embodiment of FIGS. 6 to 13 tubes are not provided so as to reduce the drag of the element. In order to maintain the structural properties of the element and ensure a degree of impact resistance intermediate the outer wall 11 of the element and the inner face are provided are provided a plurality of furrows 12 which abut or are spaced apart by a small distance from co-operating projections 13. Projections 13 project outwardly from the inner face. The furrows are, in the illustrated embodiment spaced apart from the outer wall defining a cavity between the outer face and the furrow. This is not essential. The cavity where provided may be at least partially filled with impact resisting material and/or arranged to flood on immersion in water. Deformation of the outer face causes the furrows 12 to abut the projections 13 of the inner face. The load is thus supported and transferred from the outer face. Desirably the draft angles of the furrows and projections are selected to reduce the likelihood of jamming. In the illustrated embodiment the draft angle $\alpha$ of the furrows is about 24° for example 20 to 30° and the draft angle $\beta$ of the projections is about 10° for example about 5 to 15°. It will be apparent to the skilled worker that the furrows could be provided on the inner face and the projections on the outer face. In this embodiment of the invention the outer face of the element can be generally smooth or continuous thereby reducing the drag imposed on the riser. Shell elements of this embodiment may comprise first and second components secured together. The first component may comprise an outer face section and one of furrows and projections while the other comprises an inner section and the other of projections and furrows. The sections may be secured together by welding, adhesive fasteners or in other ways.

In some embodiments of the invention the tubes, where provided are filled or solid, forming struts. In extreme circumstances filling the tubes with a material having a high compressive modulus, such as hard polyurethane elastomer can provide very good structural strength against compressive side loads.

As noted the internal configuration of the shell is preferably designed to match the riser configuration. Desirably the external form of the shell is similar to the external form of the buoyancy on the dressed riser joints.

In many cases the elements will be of the order of 1 to 4 m long to allow for efficient handling. It should however be understood that the invention is not so restricted.

In air the chamber is full of air and so the weight of the element is low and in many cases markedly lower than the weight of the equivalent sized buoyancy module. In water the chamber floods and so the bulk density of the element approaches that of the water. Accordingly the invention provides an impact protector which is both light and thus easy to handle in air but in use has a bulk density similar to that of seawater.

Where a plurality of elements are required to make up a complete shell the elements will need to be secured to one another. Those skilled in the art will have no difficulty in devising suitable ways of doing this. By way of non-limiting example one or more bands could be tensioned around the shell urging the elements together. In other embodiments of the invention the elements are bolted together. The bolts could be external or could be integral.

The complete shell is generally designed to be a sliding fit on the riser. In general sufficient shells are provided to achieve, in association with the buoyancy modules, essentially full cladding of the riser joints other than clearances necessary for assembly.

In preferred embodiments of the invention thrust collars are provided on the riser to prevent movement of the shells along the riser. It will be appreciated that since the shells are about neutrally buoyant much less thrust needs to be resisted than is the case with buoyancy modules. While it is possible to use sophisticated thrust transfer devices such as described in our GB 2 286 649 other less sophisticated system will suggest themselves to the skilled in the art.

The invention therefore provides 360-degree protection to the vulnerable components of the drilling riser from side impacts and loads from the rotary table. The device can be about neutrally buoyant (although the skilled in the art will appreciate that if so desired by appropriate material selection the device of the invention could be positively or negatively buoyant) in water but has low weight out of water. This reduces deck weight of the riser which can be a limiting factor for drilling rigs and allows easy manual assembly. By appropriate selection of materials and dimensions it should be possible to devise shells which match substantially the whole range of side load and impact conditions anticipated during offshore deep water drilling. The shell of the invention can be rapidly manufactured by mass production techniques such as rotational, blow or injection moulding leading to a cost-effective product.

What is claimed is:

1. A shell for providing impact protection to a marine drilling riser, the shell comprising a body having at least one hollow chamber defined by inner and outer faces of the shell, the body being provided with a plurality of constantly open holes arranged so that submersion of the body causes the chamber to be flooded.

2. A shell as claimed in claim 1 comprising a plurality of shell elements joined together to form the shell.

3. A shell as claimed in claim 2 wherein the holes are provided on a shell element face opposing a further shell element.

4. A shell as claimed in claim 1 comprising a rotationally molded body.

5. A shell as claimed in claim 1 comprising thermoplastics material.

6. A shell as claimed in claim 5 wherein the thermoplastics material is polyethylene.

7. A shell as claimed in claim 1 comprising a thermosetting resin composite or a thermoplastic composite.

8. A shell as claimed in claim 1 having a plurality of tubes extending through the chamber.

9. A shell as claimed in claim 2 wherein at least one tube is filled.

10. A shell as claimed in claim 9 wherein at least one tube is filled with polyurethane elastomer.

11. A shell as claimed in claim 1 wherein intermediate the inner face and the outer face are provided co-operating furrows and projections directed into the chamber such that load applied to the outer face is transferred via the co-operating furrows and projections to the inner face.

12. A shell as claimed in claim 11 wherein the furrows and projections are spaced apart when unloaded.

13. A shell as claimed in claim 1 having a length in the range of 0.5 to 5 m.

14. A shell as claimed in claim 13 having a length in the range 1 to 4 m.

15. A shell as claimed in claim 1 having density in seawater within the range of 0.95 to 1.05 times the density of seawater.

16. A method of providing impact protection to a marine riser comprising the steps of
   i) providing a marine riser and
   ii) disposing about the riser a shell as claimed in claim 1.

17. A riser impact protection assembly comprising:
   a) a shell as claimed in claim 1; and
   b) means for preventing movement of the shell along the riser.

18. A shell element for assembly with other similarly formed shell elements to form a shell for providing protection to a marine drilling riser, comprising a body having a hollow chamber defined by inner and outer walls of the shell element, constantly open holes being provided in the walls and arranged so that submersion of the body causes the chamber to be flooded, and means for co-operating with a further shell element to define a channel for receiving the marine drilling riser.

* * * * *

UNITED STATES PATENT AND TRADEMARK OFFICE
CERTIFICATE OF CORRECTION

PATENT NO.     : 6,755,595 B2
DATED          : June 29, 2004
INVENTOR(S)    : Robert Kenneth Oram It is certified that error appears in the above-identified patent and that said Letters Patent is hereby corrected as shown below:

<u>Title page,</u>
Item [30], Foreign Application Priority Data, insert:
-- Jun. 8, 2001   (GB)    0113999.7
   Sep. 7, 2001   (GB)    0121666.2 --

Signed and Sealed this

Twenty-third Day of November, 2004

JON W. DUDAS
*Director of the United States Patent and Trademark Office*